June 25, 1929. G. H. FORSYTH Re. 17,332
DISK STEEL WHEEL
Original Filed Nov. 26. 1918 3 Sheets-Sheet 1
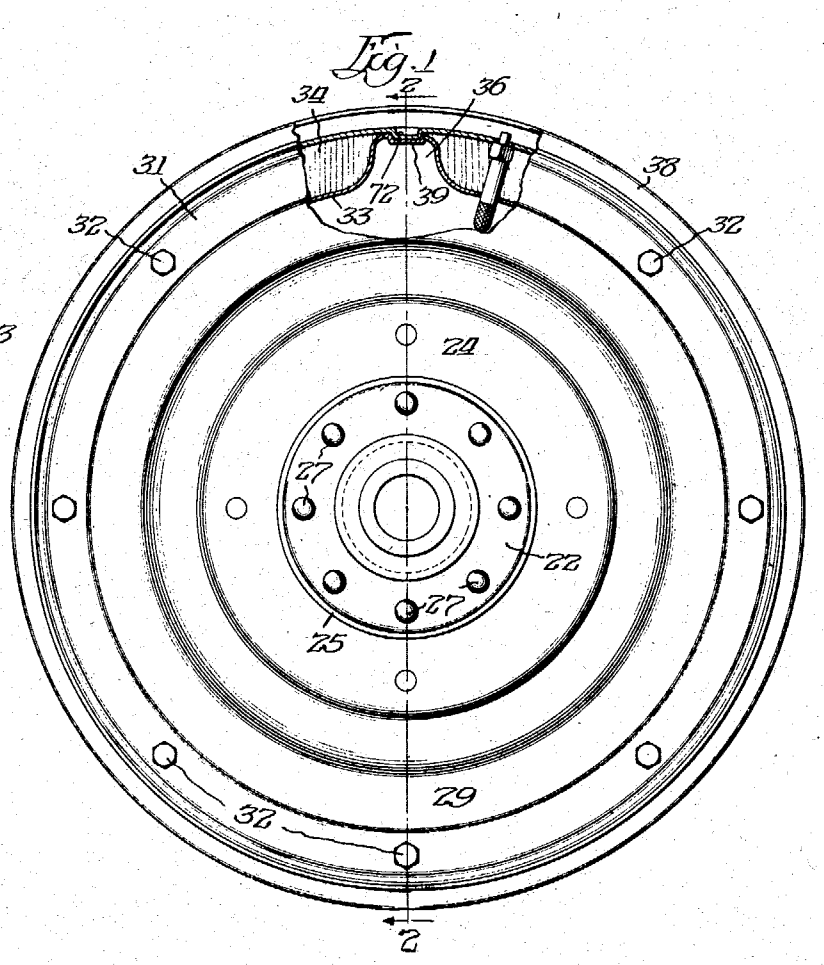
Witness:
Inventor
George H. Forsyth
By Cromwell, Greist & Warden
Attys.

June 25, 1929. G. H. FORSYTH Re. 17,332
DISK STEEL WHEEL
Original Filed Nov. 26, 1918 3 Sheets-Sheet 2
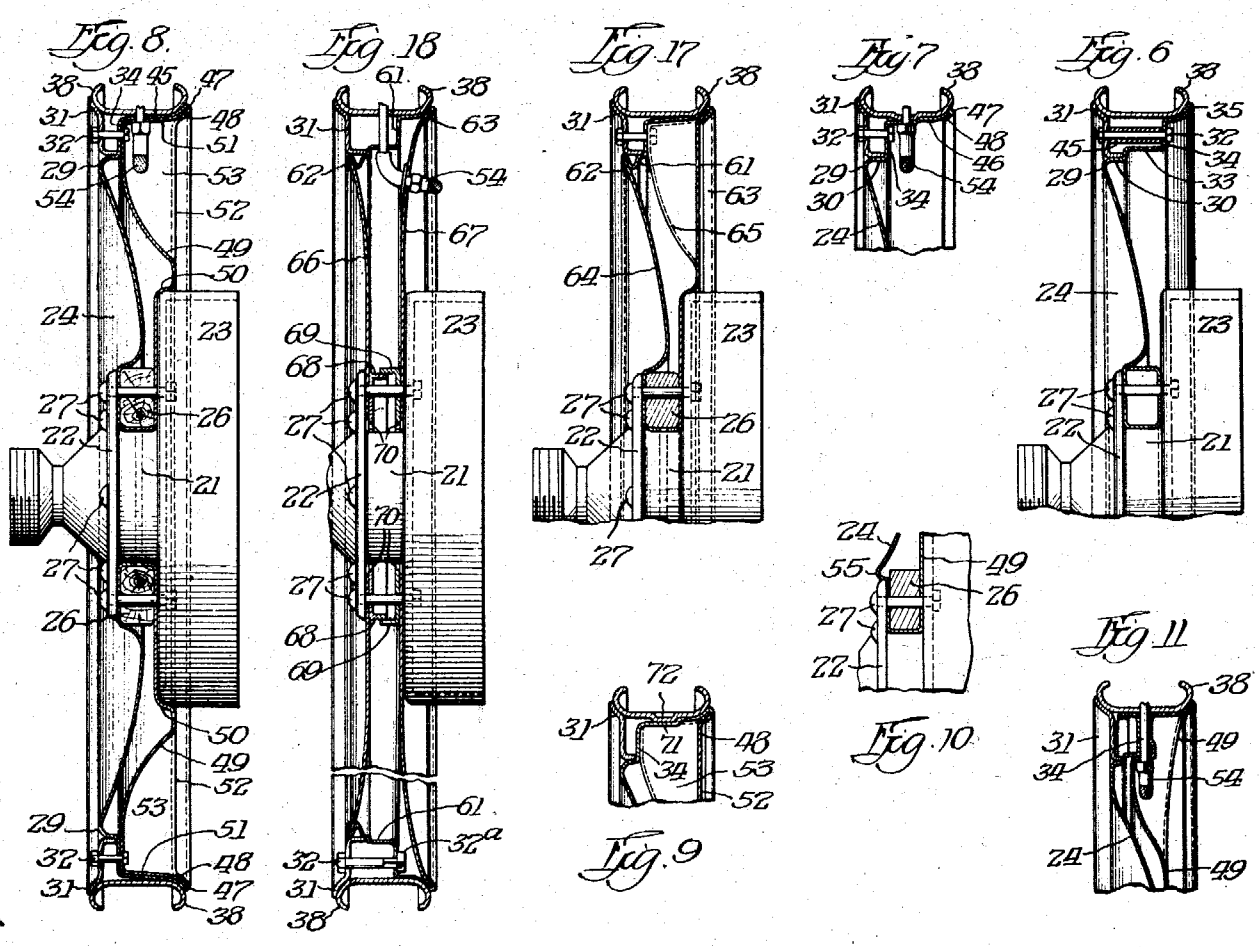
Witness:
Geo. E. Brown
Inventor
George H. Forsyth
By Cromwell, Greist & Warden
Attys.

June 25, 1929. G. H. FORSYTH Re. 17,332
DISK STEEL WHEEL
Original Filed Nov. 26. 1918 3 Sheets-Sheet 3
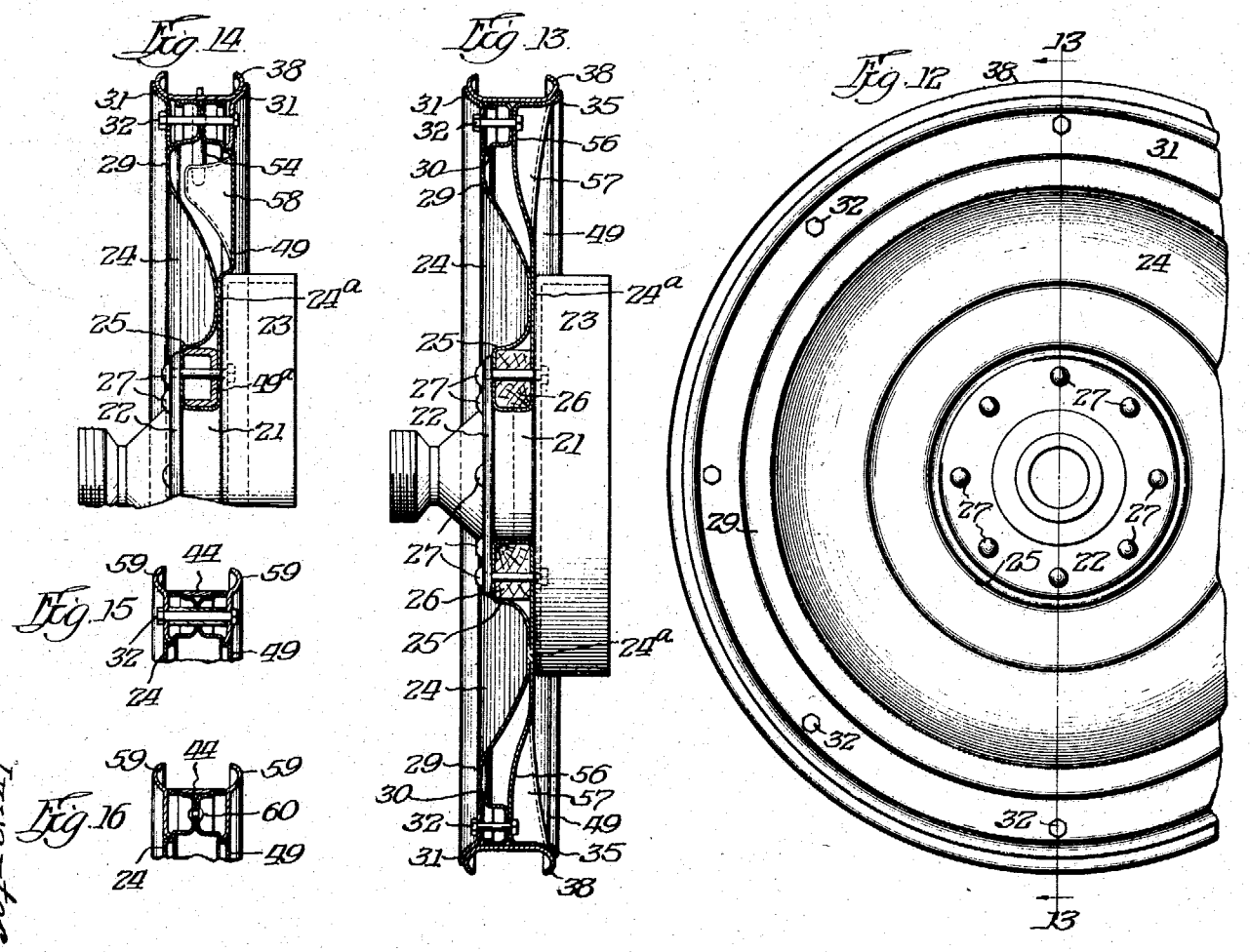
Witness:
Inventor
George H. Forsyth
By Cromwell, Geist & Warden
Attys.

Reissued June 25, 1929. Re. 17,332

UNITED STATES PATENT OFFICE.

GEORGE H. FORSYTH, OF CHICAGO, ILLINOIS, ASSIGNOR, BY MESNE ASSIGNMENTS, TO STEEL WHEEL CORPORATION, OF LANSING, MICHIGAN, A CORPORATION OF MICHIGAN.

DISK STEEL WHEEL.

Original No. 1,373,184, dated March 29, 1921, Serial No. 264,253, filed November 26, 1918. Application for reissue filed May 29, 1922. Serial No. 564,627.

By reason of the growing scarcity of materials suitable for employment in the making of wood wheels and the rapid deterioration of same under stress of weather and liability to damage by rough usage, they are coming into disfavor; the wire wheel has many objectionable features inherent in its manufacture and employment; the steel wheel of spoke or "artillery" type, while desirable from many points of view, is very expensive to manufacture; while the current types of steel disk wheels, if sufficiently strong, are heavy, unsightly, and lacking in resiliency or springiness by reason of the failure to utilize the metal to the best advantage for spring resistance to radial and lateral stresses.

The steel disk wheel is recognized as the type most cheaply constructed but it has not met with favor hitherto for other than heavy work, such as on trucks and the like, being undesirable on pleasure cars for the reasons briefly indicated above. These wheels have, in general, embodied two disks spaced apart more widely at the center and approaching each other peripherally near the point of attachment to the rim to form a column support therefor. This emphasizes optically the impression of heaviness and also sacrifices resiliency to strength, while, at the same time, failing to impart strength in the highest degree except as measured by capacity to carry dead load as distinguished from resistance to shock and to laterally applied stresses resulting from skidding, striking of curbs, etc. Where single disks have been employed, they too usually have been open to the same objections.

The primary object of the present invention, generally stated, is so to re-design the non-rigid disk wheel, of metal or other material possessing a degree of flexibility, as to retain or even to reduce its recognized low cost of production; to increase its actual strength under stresses of use while reducing the actual weight; and at the same time to impart an appearance of lightness and symmetry compatible with the best appearing pleasure car.

The particular object of the invention is to utilize by way of cooperation the inherent resilience of a disk in combination with a demountable rim so adjustably positioned on the disk periphery as to strengthen the disk by the constrictive action of the rim and to effect a secure positioning of the rim by the radial reaction of the stressed disk; the combination of these features resulting in what may be termed a "live" wheel assemblage as distinguised from the "dead" relation of a rim on the unyielding column support of a wheel of the spoke type, but not to be confused with the so-called "spring wheel" construction.

Further features of the invention are the contour relation of the disk in its central, marginal and peripheral portions to the median plane of the wheel, whereby the aforesaid "live" qualities of the assemblage are enhanced; and also the provision of reserve disk abutments for rim support under abnormal shock.

In order that the invention in its various aspects may be readily understood and appreciated by those skilled in the art, several embodiments of the invention are set forth hereinafter by way of description and exemplified in the accompanying drawings. It will be readily appreciated, however, that the description and drawings are illustrative only and are not to be taken in an unnecessarily limiting sense.

In the drawings—

Fig. 1 is a front view of a disk wheel embodying the invention, having a portion of the disk broken away to illustrate the driving connection therewith of the rim and the mounting of the valve stem;

Fig. 2 is a vertical section on the line 2—2 of Fig. 1;

Fig. 3 is a similar section showing a modification;

Fig. 4 is a fragmentary section of an adaptation to the clincher type of tire;

Fig. 5 is a fragmentary sectional detail showing a construction similar to that in Fig. 2 with the exception that the rim-retaining bolts are countersunk;

Figs. 6 and 7 are sectional views showing other slight modifications of wheels of the single disk type;

Fig. 8 is a vertical section through a rim embodying the invention and comprising double disks;

Fig. 9 is a fragmentary detail section through the peripheral portion of the wheel illustrated in Fig. 8 but at a different point;

Fig. 10 is a sectional detail showing the disposition of the disks adjacent the hub portion;

Fig. 11 is a fragmentary detail in section illustrating the mounting of the valve stem;

Fig. 12 is a front elevation of that form of wheel illustraed in section in Fig. 13;

Fig. 13 is a vertical section taken on the line 13—13 of Fig. 12;

Fig. 14 is a vertical section illustrating a type of wheel embodying the invention in which two removable rim-retaining rings are employed;

Fig. 15 illustrates an adaptation of the form of construction shown in Fig. 14 to a clincher tire;

Fig. 16 is a detail sectional view taken through the peripheral portion of the wheel represented in Fig. 14 but at a different point;

Fig. 17 is a vertical section through a wheel having a felly portion formed independently of the disk portion; and Fig. 18 is a similar section through a wheel embodying the independently formed felly portion in connection with disk portions formed of tempered spring steel plane sheets and sprung into position, illustrating also an embodiment of central spacing construction of particular value in this type.

Having reference more particularly, in the first place, to Figs. 1 to 7 inclusive of the drawings, a characteristic feature of the invention will be seen to be the construction of the wheel from a single pressed steel disk so formed as to resist radial strains and stresses on both sides of the plane of the tire, said disk being generally concave as viewed from the front of the wheel, the inner portion of the disk adjacent the hub being shaped for assemblage with and inward radial bearing on the standard hub 21 having front hub plate 22 and rear hub plate developed into the brake drum 23 whereby no special designing of the wheel hub and related parts is necessary. The said disk indicated generally at 24 is shouldered at 25 to bear against the annular wooden insert 26, occupying the space provided for spokes in the standard wood wheel, to which it is secured by bolts 27. The disk is likewise rearwardly supported by the rear hub plate and is preferably shouldered at 28 to form an inner bearing support upon the brake drum 23 in the case of those wheels associated with a brake drum; where there is no brake drum this shoulder or bend 28 imparts additional spring or resiliency to the disk between its periphery and hub portion. Beyond the point 28 it extends forwardly to 29 and thence rearwardly and then radially to form a shoulder 30 as a bearing for the rim-retaining clip ring 31 of ordinary construction, either as individual separate clips or in the form of a single annulus, adjustably and removably attached by means of the bolts 32. However, I do not limit my invention, except as specifically stated in certain of the claims, to a disk of this or any other specific contour, it being understood that the invention may be advantageously embodied in connection with disks of variously diverse forms.

It will be observed the periphery at the shoulder and the central portion at the hub are on one side of the median plane of the wheel, while the intermediate portion is on the opposite side of the median line. From the shoulder 30 the disk is again pressed rearwardly transversely of a wheel plane as indicated at 33 and again outwardly or radially as indicated at 34, being marginally beaded as indicated at 35. By the term "bead" or "beaded" I mean angularly disposed, as at in inclination, whether the edge is lipped over or not.

Thus far, the forms of construction illustrated in Figs. 2 and 3 are substantially identical. Having particular reference now to Figs. 2 and 5, though present in other figures, that portion of the disk 34, is at intervals corresponding to the bolts 32 cupped forwardly to form pockets 36 having their inner walls 37 arranged closely adjacent but spaced from the rim-retaining ring 31 in order to render possible the utilization of short bolts 32. It will be observed that the demountable rim 38 at those portions of the wheel periphery corresponding to the pockets 36 rests adjacent its inner edge, upon the outer walls of said pockets as indicated at 29 most clearly in the lower part of Fig. 2 and in Fig. 5, and in that portion of the wheel periphery intermediate the pockets rests along its inner edge upon the beaded portion 35 of the wall 34; whereas along the medial plane of the wheel, there is a space between the outer wall of the pockets and the inner face of the rim, which permits a normal amount of yielding of the disk, limited by the eventual abutment of the rim against the outer wall of the pockets whereby to prevent injury to the disk by excessive deformation.

In Fig. 5 of the drawings is illustrated a fragmentary portion of the rim periphery illustrated in Fig. 2, the only difference being that the rim-retaining ring 31 is countersunk at the bolt holes as indicated at 31[a] in order to bring the nut of the bolt 32 substantially flush with the general plane of the ring.

Having reference now to Fig. 3 of the drawing, the margin 35 of the disk is bent inwardly and instead of serving as a direct support for the demountable rim 38 a ring insert 40 is provided of substantially the same weight metal as the ring 31. This insert is secured to the marginal portion of the disk either frictionally or by riveting or spot welding, serving as an additional reinforcement against stresses and cooperating with the ring 31 for supporting the rim 38. In this form of construction the pockets of Fig. 2 are omitted and a longer bolt 32 is employed for securing the ring 31 in place.

Referring to Fig. 4 of the drawing, we have a form of construction adapted to support a clincher tire, the wall 33 of the disk serving as a shoulder support for the inner flanged members of tire-retaining felly members 41 and 42 which are secured together and to the disk at the wall 34 by means of the bolt 43. The felly members 41 and 42 are countersunk along their medial portions to receive the inlay strip 44 to guard against the inner tube being pinched therebetween.

Referring to Fig. 6, we have the same general construction as is shown in Fig. 2, except that from the disk the shoulder 28 is omitted, the disk having no direct inner bearing upon the brake drum 23 whereby the resilient action of the disk is extended from the points 29 to 25. Whether the shoulder 28 be present, as in Fig. 2, or absent, as in Fig. 6, this extending of the resilient action throughout the medial portion of the wheel would obtain in the case of such of the wheels as are not associated with the brake drum. A further point of difference is that the insert 26 is of metal and the pockets 36 are omitted as in the case of Fig. 3, longer bolts 32 being employed in connection with spacing thimbles 45, which latter, however, preclude any adjustability of the ring clip 31.

In Fig. 7, the ring-retaining bolts 32 are connected directly to the wall 34, pockets being omitted, and outwardly of the wall 34 the disk extends rearwardly as indicated at 46 and then at an inclination at 47 and lipped over at 48. Here, as in some of the other forms of construction, as shown for instance in Figs. 2, 3, 5 and 8, that portion of the disk which serves as a support for the rear edge of the demountable rim is of slightly greater normal diameter than the inner diameter of the rim 38 or the ring 40 of Fig. 3, in order that the mounting of the rim or ring will tend to spring the marginal portion of the disk inwardly placing and maintaining it under stress, thus bringing about added strength and resiliency of the wheel when assembled with the rim.

Furthermore, this design of wheel compensates for irregularities in rim diameter, utilizing the resilience of the disk under the inward thrust of the retaining ring 31 to secure a close fit of the stressed disk within the rim, and also the inner diameter of the comparatively unyielding rim 38 or ring 40 serves to true any peripheral irregularities of the disk. This compensating and truing capacity of the wheel design, is largely contributed to by the fact that the rim retaining ring or clip members 31 have a reserve degree of lateral movement about the fulcrum bearing of their inner edges on the disk or shoulder instead of abutting directly against a portion of the disk, and the opposed surfaces of the rim and disk peripheral portion are spaced apart or disposed at a slight inclination to each other.

It will be observed that the movement rearwardly of the ring clip 31 imparts a resilient outward thrust to the forward edge of the rim at the same time that the horizontal movement given by it to the rim reacts with the resiliency of the disk periphery to impart an outward thrust to the rear edge of the rim.

By the use of the term "adjustable" and "adjustably" as applied in the description and claims to the relation borne to the disk by the rim-supporting and retaining element 31, I have reference to the aforesaid reserve degree of lateral movement or capacity for additional movement after the said element contacts, under normal conditions, with the front of the rim and the rear of the rim contacts with the felly, whereby to compensate for variations in rim width and in disk or rim diameter and to insure a proper degree of radial reaction between disk and rim as distinguished from a rim-retaining member having a fixed limit of inward movement corresponding substantially to the normal point of contact between rim, disk and retaining element. Moreover, by reason of the fact that the rim-retaining element has an outward thrust upon the rim and an inward thrust upon the disk, the latter in its body portion is stressed or radially compressed, being thereby greatly strengthened as heretofore stated.

It will be understood also that the peripheral portion of the disk forming the rim-supporting felly may either be an integral part of the disk formed by bending or a separate portion riveted, welded or otherwise secured to the disk, and may be of extended width or limited to the edge of the disk itself, it being only necessary that it serve the function of a rim-support; and where there is a rearwardly extending periphery it may be of uniform gradual inclination or have a marginal outstanding flange, if serving as an abutment to limit the rearward movement of the rim on the wheel.

Thus far we have been dealing with wheels made of a single disk. Disks of the general characteristics heretofore pointed out are also peculiarly adapted for use assembled conjointly with a second disk as an added reinforcement, but preferably in such manner as to avoid interference with the resilience of the main disk, where extraordinary strains and stresses are to be anticipated, the second disk cooperating with and supplementing the first. In Fig. 8 of the drawing is illustrated a wheel, one disk and associated parts of which correspond to that illustrated in Fig. 7 and previously described. In addition to the first disk 24, however, a second disk 49 is employed having a shouldered portion 50 for bearing upon the brake drum 23 after the manner of the shoulder 28 of Figs. 2 and 3. The disk 49 extends forwardly in substantially parallel spaced relation to the disk 24 and adjacent the periphery lies against the wall 34 of the first disk, being advantageously secured thereto as by spot-welding or riveting, thus affording a double wall as an anchorage for the bolts 32. The disk 49 then extends rearwardly beneath and in contact with the portion 45 of the first disk as indicated at 51, the margin of the second disk being received within the lipped over portion 48 of the first disk. This juxtaposed relation of the second disk and the wall 34 and the wall 45 applies only to the walls of the pockets formed by cupping at points corresponding to the locations of the bolts 32 for the purpose of reinforcing said walls at that point. Throughout the intermediate portion of the wheel periphery the second disk 49 extends from the shoulder 50 in a substantially radial direction as indicated at 52 toward its margin where it enters within the lipped over portion 48 of the first disk as previously described. This is more clearly shown in Fig. 9 which is a fragmentary vertical section taken at a point in the periphery of the wheel intermediate the cupped portions 53. The pockets 53 of this form of construction furnish a convenient housing for the valve stem 54. In this embodiment, as in some others, the stressing of the primary disk 24 by the application of the clip 31 is not unduly interfered with by the column relation of the secondary disk 49 to the overhanging margin 48 of the felly.

Fig. 10 illustrates a forwardly extending shoulder 55 on the disk 24 bearing on the hub plate 22 to assist in supporting inward thrust and to protect the joint around the outer edge of the hub plate 22 against the admission of water or the like.

Fig. 11 shows a particular configuration of the pocket portions of the second disk 49 to accommodate the valve stem 54 and also shows the marginal deflection of the disk 24 outwardly instead of inwardly beneath the demountable rim 38.

In Figs. 12 and 13 are shown in front elevation and in vertical section a wheel wherein the first disk 24 is formed throughout in substantially the same manner as that shown in Fig. 11. In this case, however, the bottom wall 56 of the pockets 57 extends in a substantially radial direction, the disk 49 having its marginal portion lipped over as indicated at 35. As in Fig. 8, the bottom of the pockets are spot-welded to the first disk adjacent the opening for the bolts 32. If desired the disks 24 and 49 may be joined as by welding at 24[a].

Fig. 14 shows a form of double-disk wheel adapted to the employment of two rim-retaining rings 31 arranged on opposite sides of the wheel to bear against the opposite edges of the demountable rim 38. Here the first disk 24 has the same configuration as the corresponding disk in Fig. 13 while the peripheral portion of the disk 49 is of similar configuration to the disk 24, these disks extending in juxtaposed relation and apertured to receive the bolts 32 the opposite headed ends of which engage the two rim-retaining clip rings 31 and the outer marginal portions of both the disks being bent over in opposite directions to underlie the rim 38. At one point adjacent the valve stem the wall 49 is cupped forwardly to form a pocket giving access to the valve stem as indicated at 58. If desired the disks 24 and 49 may be joined as by spot-welding at 24[a]; and instead of the wood filler heretofore shown at the hub a circular metal channel support 49[a] may be employed.

In Fig. 15, the separate demountable rim 38 of other figures is omitted and the rim-retaining clip ring 31 substituted by similar members 59 having their upper edges inturned to a greater extent to act as tire-retaining flanges. In this form of construction the marginal portions of the two disks 24 and 49 are countersunk or channeled to receive the inlay strip 44. This same form of construction at a different portion of the tire periphery, that is to say intermediate the bolts 32, is illustrated in Fig. 16, juxtaposed portions of the two disks being connected fixedly together by the rivets 60. In Figs. 13 and 14 the outwardly turned peripheral edge or edges supporting the rim are preferably slightly inturned whereby after the rim has been placed in position there is introduced between the latter and the said peripheral edge or edges a spring engagement.

In Figs. 17 and 18, in addition to the two disks employed, entirely independent in their relation to each other, is illustrated a supplemental felly member serving to connect the marginal portions of the two disks and to support the rim. The felly member is indicated at 61. It has a configuration characterized by marginal beads 62 and 63 for taking over the marginal portions of the two disks 64 and 65. It provides a shoulder for the bearing of the rim-retaining ring clip 31 and also for the rear edge of the rim 38. By its use, it is rendered possible to use disks 64 and 65 of lighter metal than would otherwise be permissible.

The two disks 64 and 65 of Fig. 17 are in their medial portion of substantially the same configuration as those shown in others of the views as, for instance, Fig. 8.

Having particular reference, however, to Fig. 18, a form of disk is employed both in front and to the rear which, associated and united by means of this felly member, enables the employment of highly tempered spring steel disks, whereby exceptional strength is obtained accompanied with great resiliency.

The forward disk 66 and the rear disk 67 are of slightly different diameter but otherwise the same. They may be punched from a plane sheet of tempered steel and are not necessarily formed in dished shape by a press. The felly member 61 having been formed by rolling, the disk 66 and the disk 67 are placed on opposite sides thereof and forced inwardly toward each other at their central portions whereby they are sprung into cup shape and their marginal portions, originally held apart by the lipped over margins 62 and 63 of the felly member, are contracted so as to clear the lips and snap into the space formed thereby. They are then permitted to separate sufficiently in their central portion to allow their margins to be forced outwardly under the spring of the disks as far as permitted by the felly member, by which they are held under inwardly applied radial stress. Here they are retained by the inherent tension of the metal tending to resume its former plane. This forms a wheel of exceeding strength and resiliency, presenting a maximum of resistance to deforming strain and insuring a return of the wheel to its original shape after deformation.

As a particularly efficient method of assembling the disks and felly member in the relation above described, and holding the same in assembled relation, I arrange within the space between the two disks about the hub portion two telescopically disposed cuplike plates 68 and 69, the inner wall of one and the outer wall of the other being threaded for mutual interengagement as shown. The inner peripheries of these two plates are provided with notches or holes 70 for engagement by a spanner wrench or the like in order that they may be angularly adjusted relatively to each other. By turning these plates in one direction they are caused to approach one another and thus allow the central portion of the disks to be pressed together dishing the disks and reducing their diameter sufficiently to allow them to enter the lips 62 and 63 of the felly member. Having done so, they are turned in the opposite direction, spacing the central portion of the disks farther apart and thus supplementing the spring tension of the disks in firmly seating the margins of the same within the lips of the felly member. Hereafter the plates 68, 69 constitute a filler member holding the plates in fixed relation at their centers and being themselves prevented from further relative movement by means of the bolts 27 uniting the hub plates 22 with the brake drum 23 and transfixing the filler plates 68 and 69, which latter prevent any relaxing of the spring stress of the disks due to the tightening of the bolts 27. Herein the valve stem 54 is made exteriorly accessible by passing through the disk 67, and the ring-retaining bolts 32 have their heads 32[a] disposed within the space between the disk 67 and the felly member 61, being prevented from turning in the felly member by the engagement therewith of a polygonal shank.

An interlocking driving connection between the felly member or portion of the disk and the rim may be provided by forming depressions or elevations 71 on the former for engagement with the driving lug 72 of the rim, as indicated, for example in Figs. 2 and 9. Obviously, instead of specially provided elevations or depressions 71, the same interlocking relation to the driving lug may be had by disposing the lug in the circumferential space between the outer walls of two adjacent pockets 36. Intermediate the pockets, also, the space between the disk portion 33 and the rim provides for the accommodation of the latching device of the two ends of the usual demountable rim.

I claim:

1. In a disk wheel of the class described, the combination with the hub, and a demountable rim, of a disk body centrally supported at the hub and peripherally providing a rear abutment for the rim, and a member adjustably connected to the disk and acting on the rim in cooperation with the abutment to position and inwardly support the same.

2. In a disk wheel of the class described, the combination with the hub, and a demountable rim, of a disk body centrally supported at the hub and peripherally providing a rear abutment for the rim, and a rim positioning and retaining member removably associated with the disk, said member being interposed between laterally converging portions of the disk, and rim and being adjustable laterally of the disk in movable relation to the rim whereby to provide a support for the rim upon the disk.

3. In a disk wheel of the class described, the combination with the hub, and a demountable rim, of a disk body centrally supported at the hub, and peripherally providing a rear abutment for the rim, a rim positioning and retaining member movable independently of the rim and acting upon the same in opposition to the abutment, and an adjustable connection between the disk and said member.

4. In a disk wheel of the class described, the combination with the hub, and a demountable rim, of a disk body having its inner portion secured to the hub and its outer margin arranged at an inclination to form a rear rim retaining abutment, a front rim positioning and retaining member fulcrumed at its inner portion upon the disk and bearing with its outer portion upon the rim, and adjustable means connecting the disk and said member intermediate its two margins.

5. In a wheel, the combination with the hub and rim, of a single disk body having its inner portion secured to the hub, its middle portion forwardly concave, and its outer portion adapted to support a demountable rim, those portions of the disk adjacent the hub and rim being in front and the intermediate portion in the rear of the median plane of the wheel, and releasable means for holding the rim on the felly.

6. In a wheel, the combination with the hub and rim, of a single disk having its inner portion secured to the hub, its medial portion forwardly concave, and its outer portion reversely bent to form a felly adapted to support a demountable rim, that portion of the disk adjacent the hub and felly being in front of and the intermediate portion in the rear of the median plane of the wheel, and releasable means for holding the rim on the felly.

7. In a wheel, the combination of a hub portion, a disk body having a peripheral overhanging felly portion terminating in an elevated marginal rim-supporting bead, the felly provided in its medial portion with spaced projections extending radially slightly less than the height of the bead whereby to form a reserve rim support as the bead yields under abnormal shock.

8. In a wheel, the combination of a hub portion, and a disk body having a peripheral overhanging felly portion terminating in an elevated marginal rim-supporting bead, the felly cupped at intervals in the medial portion thereof to provide portions projecting radially slightly less than the height of the bead, whereby to form a reserve rim support as the bead yields under abnormal shock.

9. In a steel disk wheel for demountable rims, the combination of a disk body portion, and a rim carrying portion, the latter provided on its periphery with a series of separated rim supporting elevations arranged to provide therebetween in the medial plane of the wheel a clearance space for the accommodation of the usual driving lug and latch mechanism of a demountable rim.

10. In a wheel, the combination with the hub and rim, of a sheet steel disk having its inner portion secured to the hub, its medial portion forwardly concave, and its outer portion reversely bent to form a felly, the margin of the disk arranged at an inclination to form a rear rim-retaining and supporting bead, said felly portion provided at intervals inwardly of the bead with forwardly cupped pockets, a rim-retaining beaded ring disposed on the forward side of the felly opposite its beaded margin, and ring securing bolts seated in the pockets.

11. In a wheel, the combination of a hub, and a disk body peripherally offset to provide a felly for receiving a demountable rim, the felly provided on its periphery with portions spaced unequally from the inner face of the rim, the most closely adjacent of the portions serving as a rim support and the space separating the rim from the other of the portions serving to accommodate the usual rim latch.

12. In a wheel, the combination with the hub and rim, of a pressed sheet steel disk having its inner portion secured to and bearing radially upon the hub, its medial portion forwardly concave, and its outer portion reversely bent to form a felly, the margin of the disk arranged at an inclination to form a rim-retaining bead, and a rim-retaining ring removably attached to the forward peripheral disk portion opposite its beaded margin, the disk having pockets formed therein adjacent the felly, the outer extremities of the pockets terminating radially a slight distance short of a rim mounted on the felly whereby to form an abutment to oppose undue yielding of the felly under radial stresses.

13. In a wheel, the combination with the hub and rim, of a pressed sheet steel disk having its inner portion secured to the hub, its medial portion forwardly concave, and its outer portion reversely bent to form a felly, the margin of the disk arranged at an inclination to form a rear rim-retaining bead, the felly portion of the disk extending transversely of the wheel toward the rear and then radially and terminating marginally in an inclined rim-retaining bead, said felly portion provided at intervals inwardly of the bead with forwardly cupped pockets, a rim-retaining beaded ring disposed on the forward side of the felly opposite its beaded margin, and ring securing bolts seated in the pockets, the outer extremities of the pockets terminating radially a slight distance within a rim mounted on the felly, whereby to form a reinforcing abutment to oppose undue yielding of the felly under radial stresses.

14. In a wheel, the combination with a hub portion, of a disk centrally secured thereto with its peripheral portion laterally bent and extending across the plane of impact to form a felly with a rear marginal bead, the felly portion provided at intervals with inwardly concave pockets, a rim supported by its rear edge of the bead of the felly, and a rim-retaining ring fulcrumed with its inner edge on the disk and with its outer edge supporting the forward edge of the rim.

15. In a wheel, the combination with a hub portion, of a disk centrally secured thereto with its peripheral portion laterally bent and extending across the plane of impact to form a felly with a rear marginal bead, the felly provided at intervals with inwardly concave pockets having outwardly convex walls extending slightly above the general medial surface of the felly, a rim supported by its rear edge on the felly bead, and a rim-retaining ring fulcrumed with its inner edge on the disk and with its outer edge supporting the forward edge of the rim.

16. In a wheel, the combination with a hub portion, of a disk centrally secured thereto with its peripheral portion laterally bent at an inclination to form a felly with a rear marginal bead, the felly provided at intervals with inwardly concave pockets having outer walls projecting beyond the general surface of the felly and merging rearwardly into the bead below the extreme elevation thereof, the rim supported by its rear edge on the edge of the felly bead closely adjacent the outer walls of the pockets, and a rim-retaining ring fulcrumed with its inner edge on the disk and with its outer edge supporting the forward edge of the rim, whereby the outer walls of the pockets form a reserve support for the rim under abnormal shock.

17. In a wheel, the combination with the hub and rim, of a pressed sheet steel disk having its inner portion secured to and bearing radially upon the hub, its medial portion forwardly concave, and its outer portion reversely bent to form a felly, the margin of the disk arranged at an inclination to form a rear rim-retaining bead, and a rim-retaining ring adjustably attached to the forward peripheral disk portion opposite its beaded margin.

In testimony whereof I have hereunto signed my name.

GEORGE H. FORSYTH.